Figure 8:
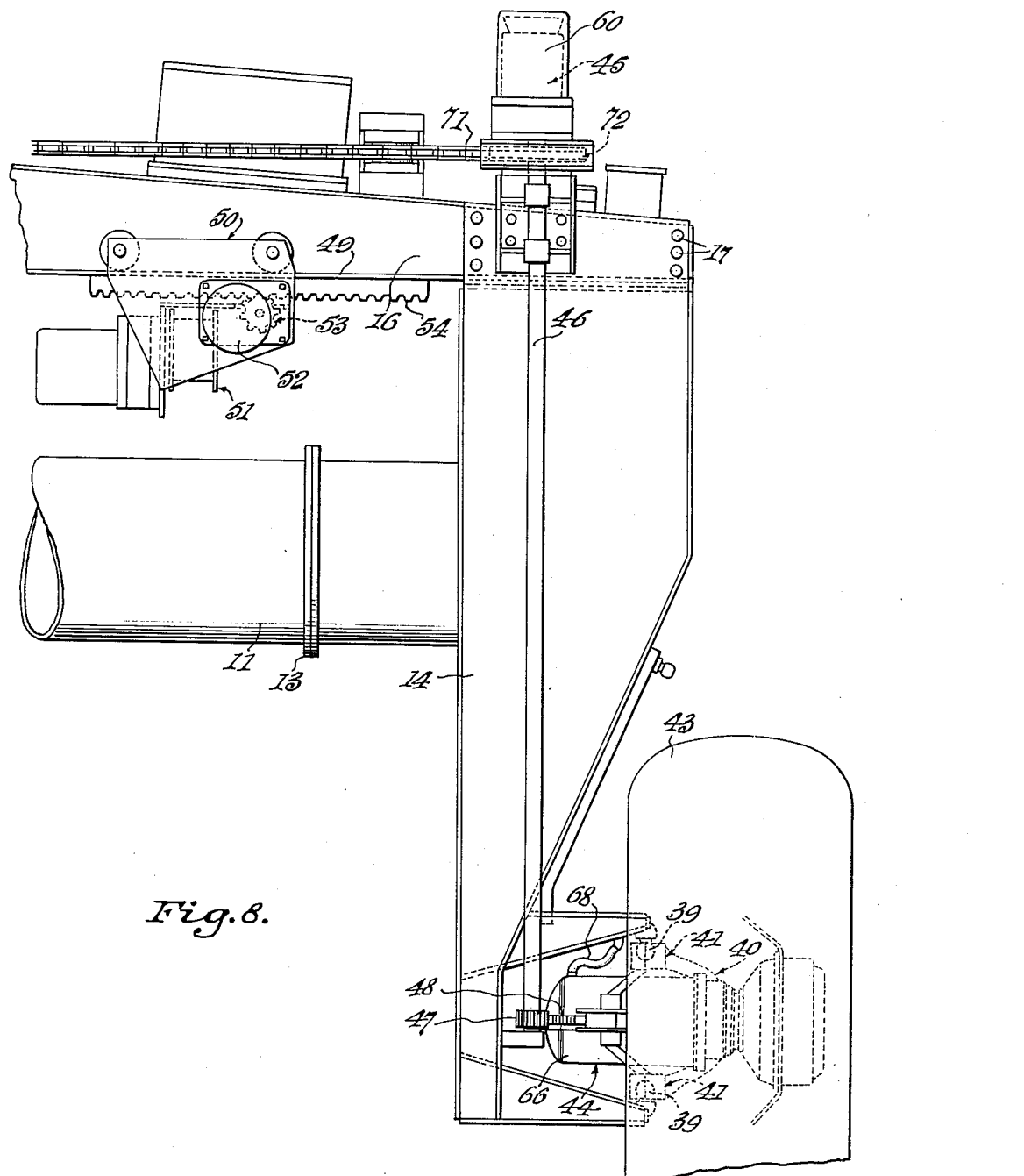

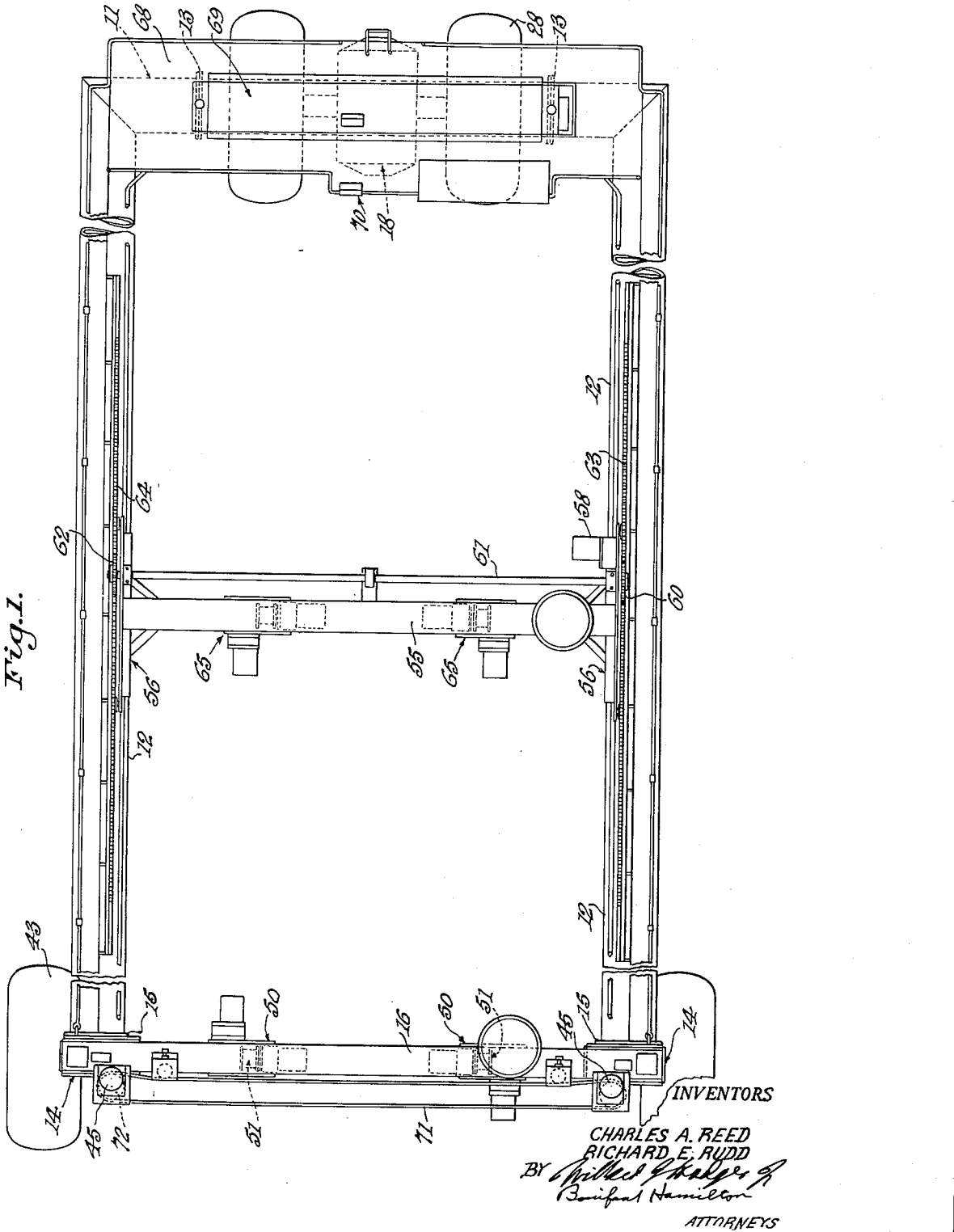

July 17, 1962
C. A. REED ET AL
3,044,567
RETRIEVER
Filed Jan. 16, 1959
8 Sheets-Sheet 2
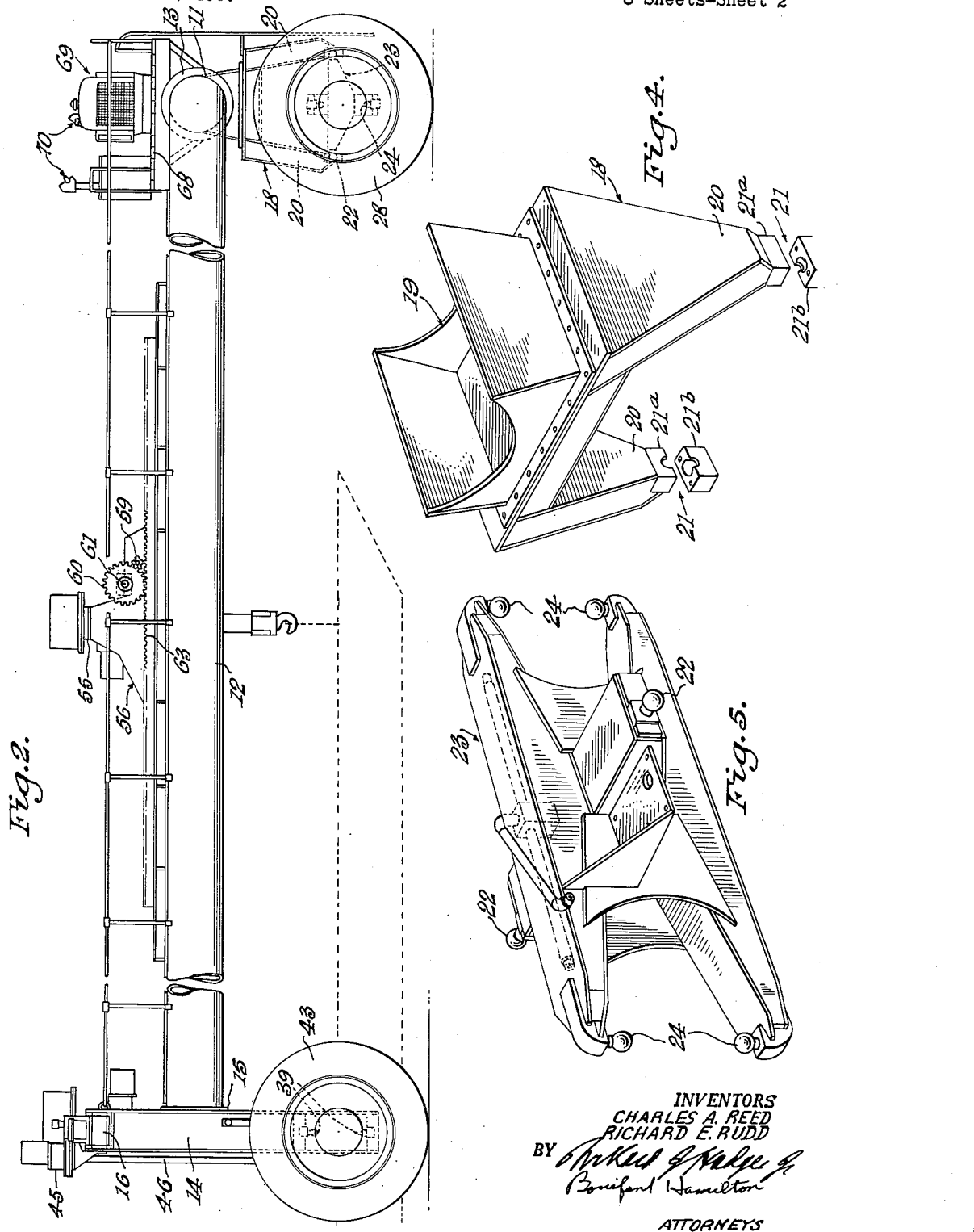
INVENTORS
CHARLES A. REED
RICHARD E. RUDD
BY
ATTORNEYS

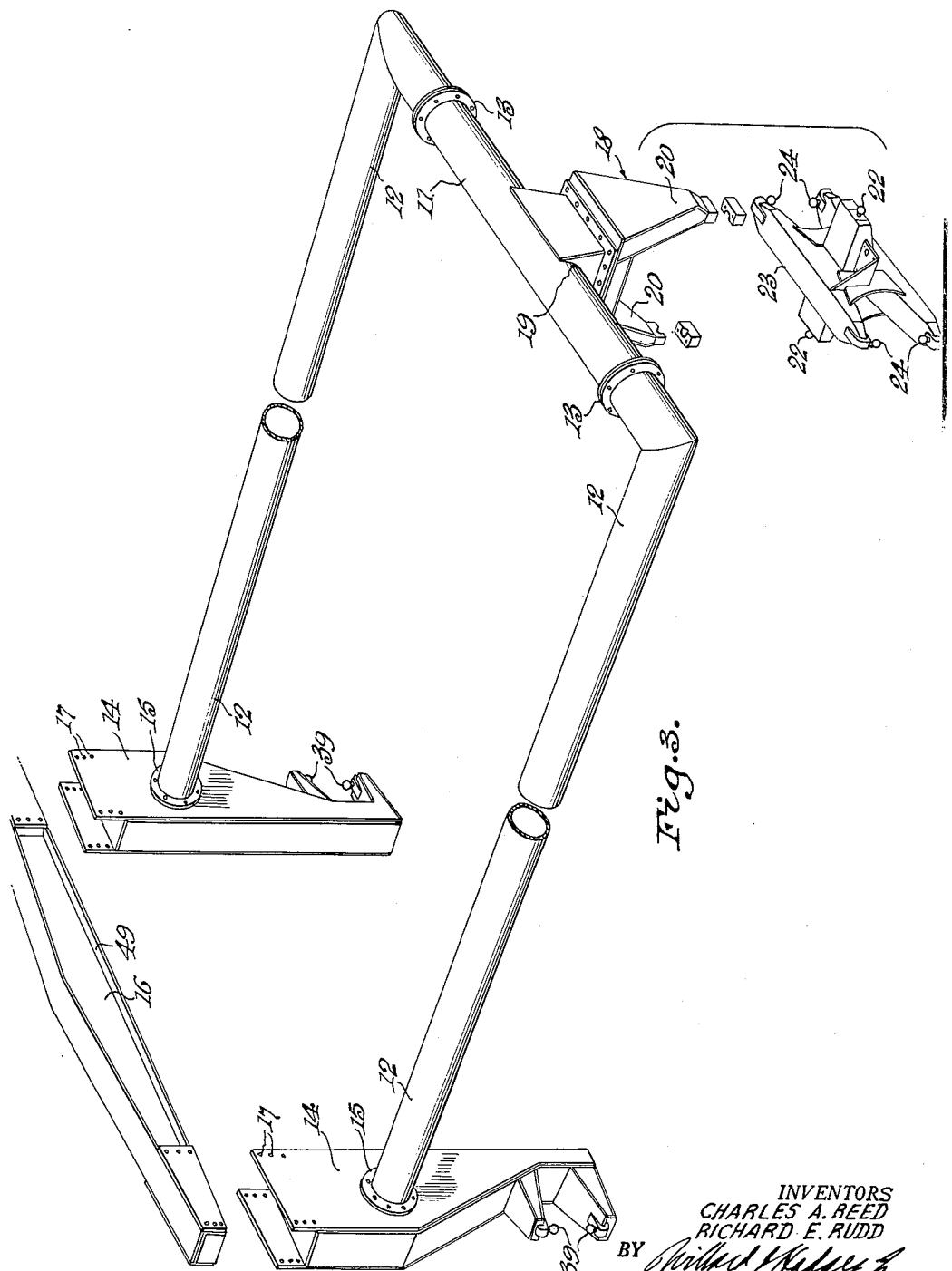

July 17, 1962  C. A. REED ET AL  3,044,567
RETRIEVER
Filed Jan. 16, 1959  8 Sheets-Sheet 4
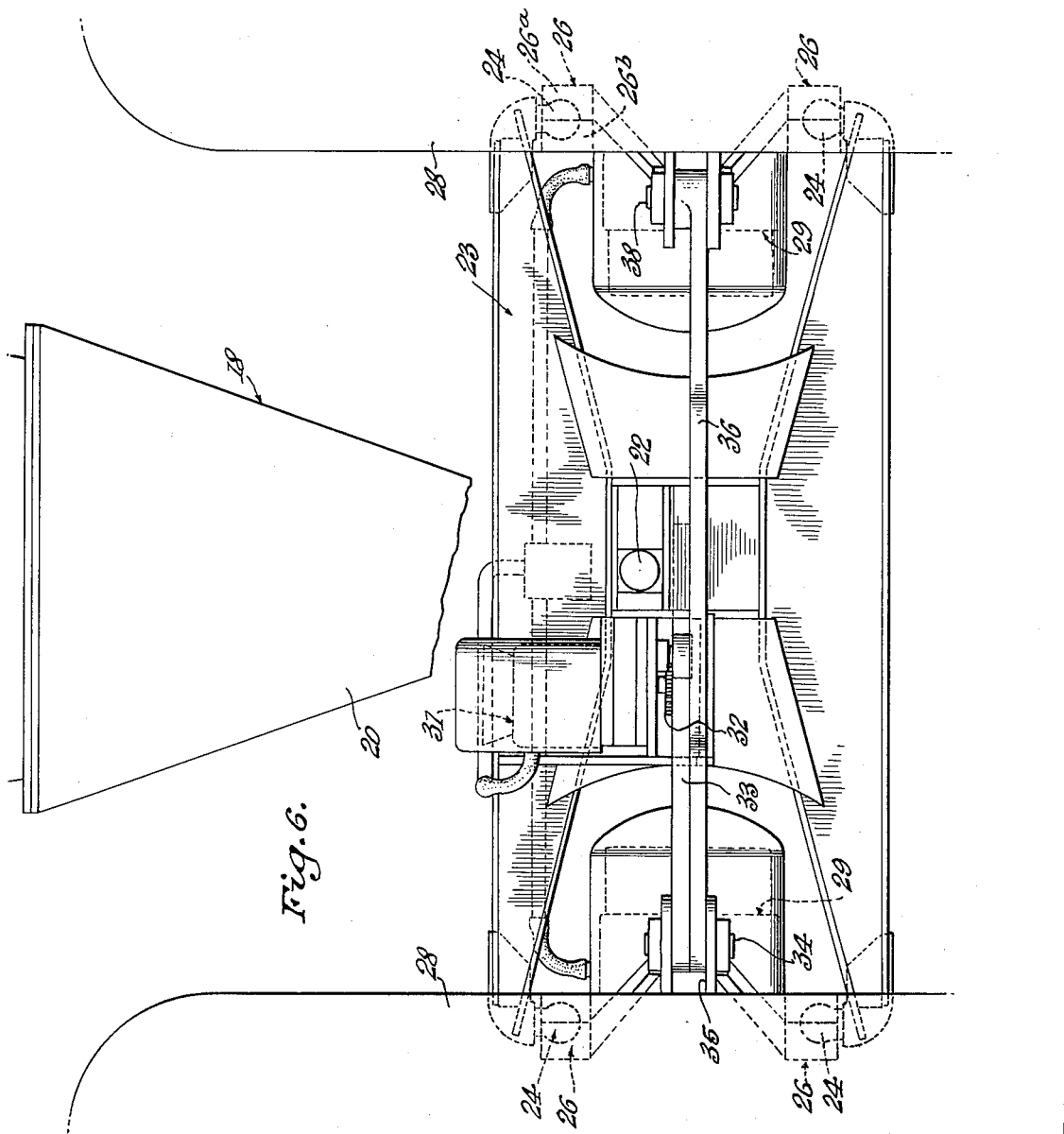
INVENTORS
CHARLES A. REED
RICHARD E. RUDD
BY
ATTORNEYS

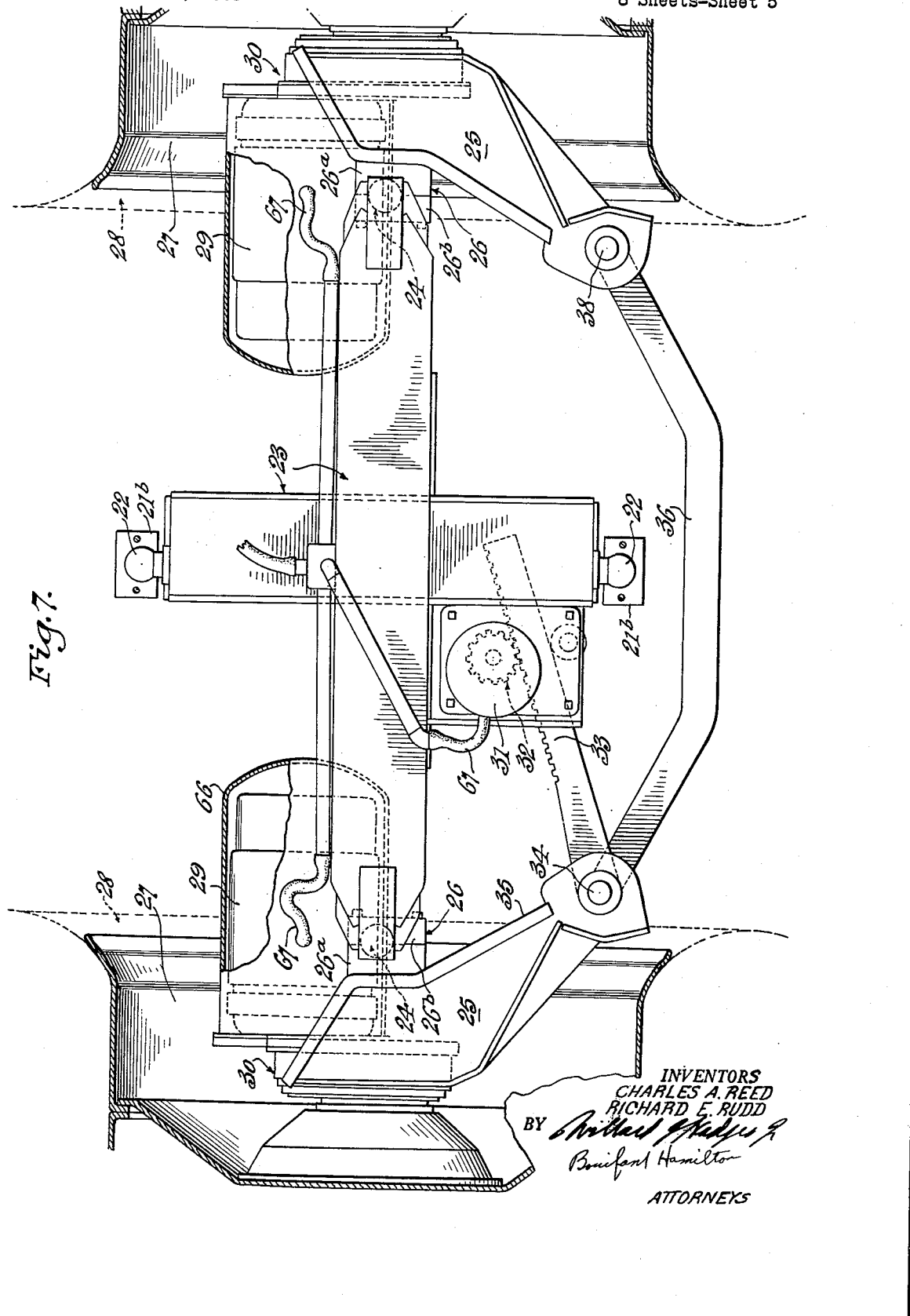

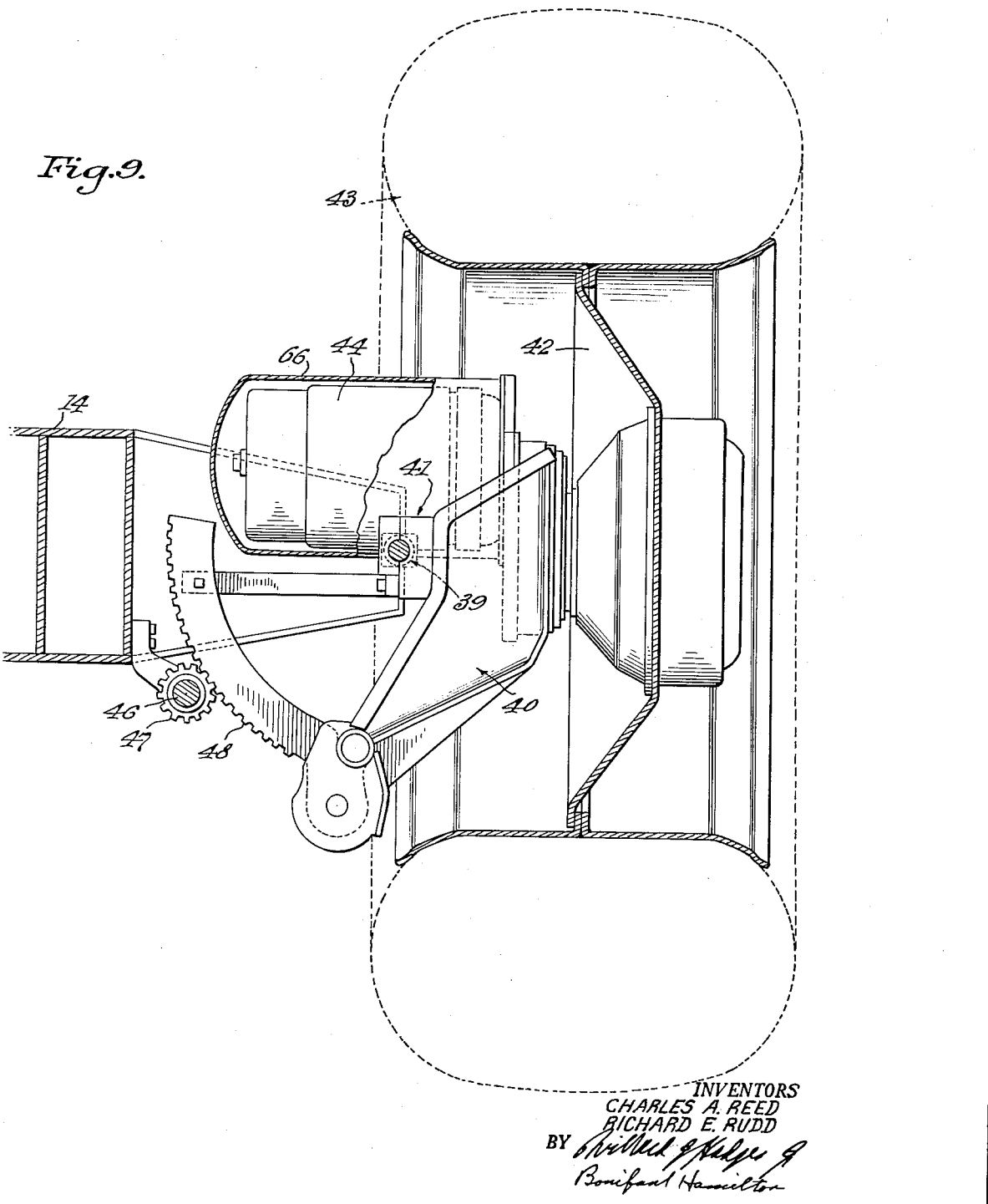

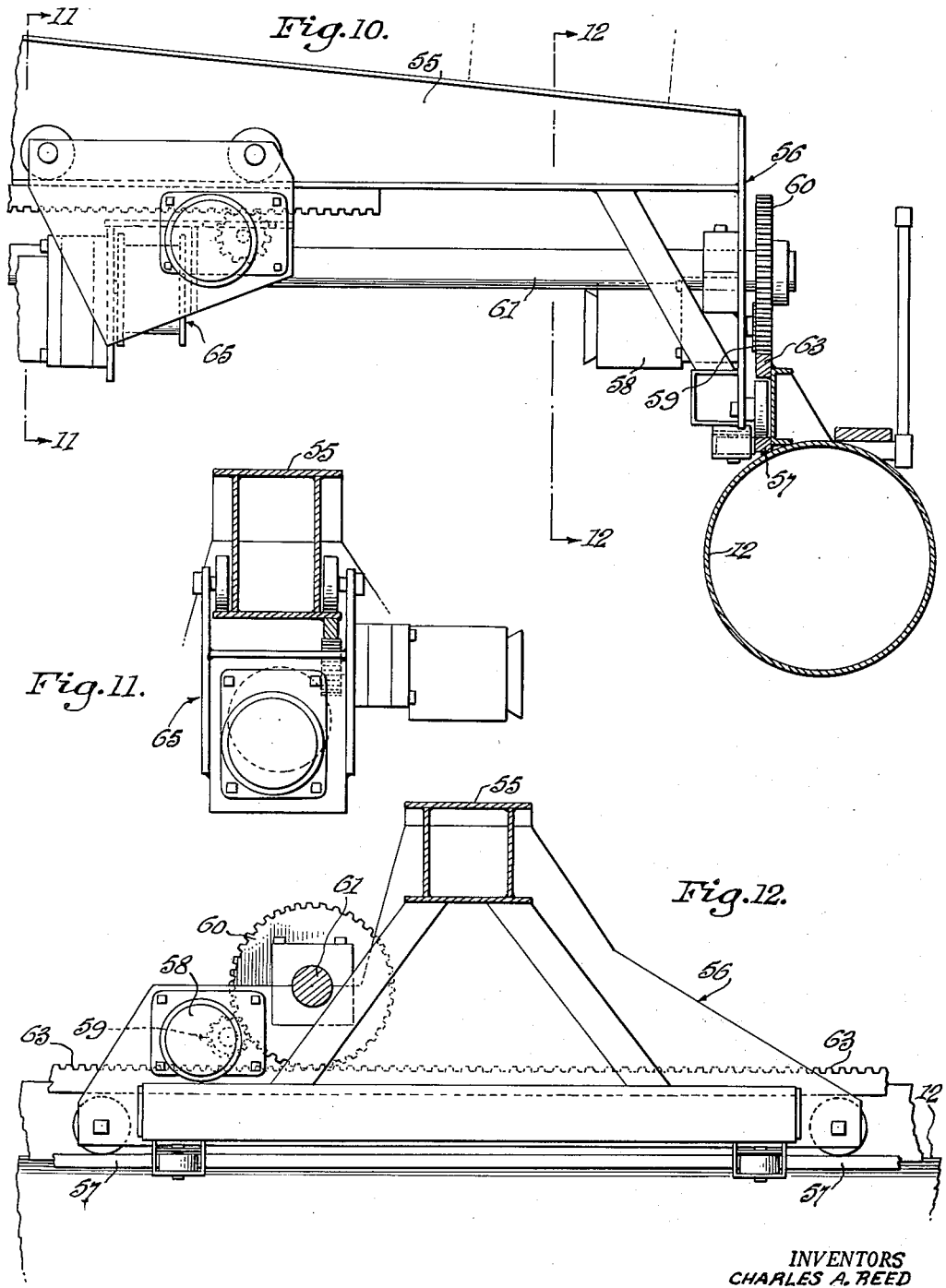

United States Patent Office
3,044,567
Patented July 17, 1962

3,044,567
RETRIEVER
Charles A. Reed, New York, N.Y., and Richard E. Rudd, Providence, R.I.; said Reed assignor to the United States of America as represented by the Secretary of the Army
Filed Jan. 16, 1959, Ser. No. 797,556
4 Claims. (Cl. 180—45)
(Granted under Title 35, U.S. Code (1952), sec. 266)

The invention described herein may be manufactured and used by or for the Government for governmental purposes without payment of any royalty thereon.

This invention relates to a vehicle and more particularly to a landing craft retriever. A principal use of the landing craft retriever is to provide a means for speedily righting a craft capsized or broached on a beach, transport it to deeper water, or carry it bodily out of the water onto the shore for necessary repairs.

One of the most dangerous hazards to the success of amphibious operations is the congestion at the beachhead due to sunken or grounded landing craft caused by enemy action, high winds, or rough seas. Such congestion slows the unloading of personnel and supplies and jeopardizes the success of the amphibious operation. The landing craft retriever provides a new concept of retrieving impaired landing craft. It is readily apparent that the landing craft retriever is applicable not only to military operations but to non-military uses as well, such as at shipyards for launching and retrieving water borne craft for dry-docking operations and for overland hauling of bulky loads or of military land vehicles such as tanks when such vehicles have been impaired.

It is a principal object of the present invention to provide a vehicle capable of straddling immobilized landing craft and retrieving such craft by elevating them to a freely suspended position within the vehicle to transport such craft quickly over soft, sandy terrain.

It is a further object of the present invention to provide a self-propelled sectionalized vehicle for transporting immobilized landing craft, which vehicle may be assembled and disassembled with standard equipment, for transportation.

It is a further object of the present invention to provide a self-propelled sectionalized vehicle for quickly transporting immobilized landing craft, which vehicle is maneuverable and easily controlled by one operator over soft, sandy terrain.

These and other objects will become apparent as the description proceeds, in which—

FIG. 1 is a plan view of the landing craft retriever;
FIG. 2 is an elevational view of the landing craft retriever showing a landing craft represented in dashed outline positioned for transport;
FIG. 3 is a perspective view of the principal structural members forming the chassis of the landing craft retriever;
FIG. 4 is a perspective detailed view of a part of the front wheel support structure, attached to the chassis as shown in FIG. 3;
FIG. 5 is a perspective detailed view of the structure for mounting the front wheels and forming part of the chassis as shown in FIG. 3;
FIG. 6 is an elevational view of the structure for mounting the front wheels;
FIG. 7 is a detailed plan view of the steering mechanism for the front wheels;
FIG. 8 is an elevational view looking toward the right rear wheel showing details of the rear wheel steering and hoist mechanism;
FIG. 9 is a plan view partly in section showing details of a rear wheel steering arrangement;
FIG. 10 is an elevational view, partly in section, of a portion of the traveling beam showing the beam drive and a hoist;
FIG. 11 is a view taken on line 11—11 of FIG. 10; and
FIG. 12 is an elevational view taken on the line 12—12 of FIG. 10 illustrating a drive mechanism for the traveling beam.

Referring to the drawings, the basic chassis of the landing craft retriever is a tubular U-shaped frame having a front transverse member 11 and two longitudinal members 12. The longitudinal members 12 are connected to the front transverse member 11 by bolted flange couplings 13. The rear ends of the longitudinal members 12 are connected to upright rear legs 14 by bolted flange couplings 15. A rear transverse beam 16 is bolted to the tops of each of the rear legs 14 at points 17 above the connection with the longitudinal members.

A front leg 18 has a saddle 19 which receives front transverse member 11. Front leg 18 has two fork legs 20, each of which carries a socket 21 which is constructed of two hemispherically-dished parts 21a and 21b bolted together. When sockets 21 are coupled with balls 22 carried by the front horizontal axle 23, the resulting ball and socket couplings form a horizontal, longitudinal pivotal axis about which front horizontal axle 23 pivots or rocks as the vehicle traverses uneven terrain.

The front horizontal axle 23 carries a pair of balls 24 at each end thereof which are vertically aligned. A front hub axle unit 25 is pivotally coupled to each end of the front horizontal axle 23 by sockets 26 which receive balls 24. Sockets 26 are comprised of two substantially hemispherically-dished parts 26a and 26b bolted together. Each hub axle unit 25 therefore pivots in a horizontal plane about a vertical axis to allow steering of the vehicle. A hub 27 is carried on each hub axle unit 25 by appropriate anti-friction bearings (not shown). Each hub 27 carries a pneumatic tire 28. A drive motor 29 is mounted on each front hub axle unit and drives the respective hub by a torque transmitting gear arrangement contained in the housing 30.

A steering motor 31 is mounted on front horizontal axle 23 and drives a pinion gear 32 which meshes with rack gear 33. Rack gear 33 is pivotally coupled at 34 with lever arm 35 which is a part of the right front hub axle unit 25. A connecting rod 36 pivotally inter-connects the front hub axle units 25 at pivots 34 and 38 so that the front wheels will always be aligned for steering purposes. Steering motor 31 can, of course, be driven in either direction of rotation for steering.

Rear legs 14 each carry a pair of balls 39 disposed to form vertical pivot axes. A rear hub axle unit 40, similar to front hub axle units 25, is coupled to each leg by sockets 41 each of which is constructed of two parts bolted together to receive the balls 39 to form ball and socket couplings which allow each rear hub axle unit 40 to pivot in a horizontal plane about a vertical axis for steering. Each rear hub axle unit 40 also carries a hub 42 which carries a pneumatic tire 43 and each rear hub is driven by a driving motor 44 which is mounted on the rear hub axle unit 40. A rear steering motor 45 is mounted adjacent the top of each rear leg and drives a shaft 46 which extends downward to a point adjacent the respective hub axle unit. At the lower end of shaft 46 a pinion gear 47 meshes with gear segment 48 which is rigidly attached to the hub axle unit 40. A chain 71 passes around two sprockets 72 carried on each shaft 46 as shown to insure that the rear wheels are always aligned during operation of the steering motors 45. Of course, rear steering motors 45 are separately controlled and can be driven in either direction of rotation and, by the device above described, provide steering for the rear wheels.

Rear transverse beam 16 is essentially an I-beam having a web which increases in height toward the center thereof. The lower flange 49 serves as a track for a pair of traveling trollies 50, each of which supports an electric hoist 51. Each trolly 50 is propelled along the flange track 49 by a motor 52 which drives a pinion 53 which meshes with rack gear 54 carried by rear transverse beam 16. The trolly propulsion motors 52 are reversible, and by the gear arrangement shown produce a propulsion force to move the trolly in either direction along the rear transverse beam.

A transversely extending, longitudinally traveling beam 55 extends from one longitudinal member 12 to the other and is supported at each end by a carriage 56 which runs on a track 57 carried by each of the longitudinal members 12. A traveling beam propulsion motor 58 is mounted on the right carriage 56 and drives a pinion 59 which meshes with gear 60. Gear 60 is mounted on a shaft 61 which extends to the opposite longitudinal member 12 and carries another gear 62 of the same size as gear 60. Gears 62 and 60 respectively mesh with rack gears 63 and 64 carried on the longitudinal members 12 and thereby propel both carriages 56 at the same speed to always insure proper alignment of traveling beam 55. A pair of electrically propelled trollies carrying electric hoists 65, substantially identical to the trollies and hoists carried by rear transverse beam 16 and described above, are carried by traveling beam 55. The retriever, therefore, has a total of four electric hoists, two on each of the transverse beams, each having a separately controlled lifting and lowering motor, and each mounted on a trolly propelled in the transverse direction by a separately controlled motor. Further, transverse traveling beam 55 is propelled in the longitudinal direction by still another separately controlled motor.

In one existing embodiment the landing craft retriever is designed to operate in water up to a depth of eight feet. The pneumatic tires are ten feet in diameter. These dimensions indicate that all four electric driving motors and the front steering motor operate while submerged in water. Further, all of the electric motors are subject to water spray from the surf, etc. Therefore, all electric motors are housed in fluid-tight housings (for example at 66). An air compressor unit (not shown) constantly supplies the motor housings with compressed air to insure against any water leakage which would short the electric motors. Air lines are shown at 67.

Since the retriever is designed to operate in the water and on beaches, it must be equipped to traverse substantially any type of terrain, including soft, marshy beaches. Therefore the pneumatic tires are provided with pressure controlling devices for deflating the tires to a desired extent, thereby increasing the contact area of the tires to the ground and consequently decreasing the unit pressure on the ground. By this method, the ability to traverse soft beaches is greatly increased. The pressure controlling device of course includes appropriate conventional pressure regulators and valves, and is coupled wtih the air compressor mentioned above for inflating the tires as desired. This concept is well known in heavy earth moving equipment, and, although included in the present structure, is not regarded to be within the scope of what is novel in the instant device.

Mounted atop front transverse member 11 is a platform 68 which supports a diesel-electric generating unit 69 which generates all required electric current, both direct and alternating, necessary for operation of the various motors and accessories of the retriever. The specific electrical circuitry used in the retriever is considered to be conventional and includes standard components which are well known. Accordingly, the circuitry is not a part of the present invention. However, it is necessary for obtaining maximum maneuverability and maximum utility that all driving motors, all hoist motors, all trolly propulsion motors, and all steering motors be individually controllable and reversible and circuitry must be provided to accomplish this result. The specific details of the connections for the various electrical driving motors and the controls therefor are considered to be expedients well known to those skilled in the art and are therefore not described herein. Alternating current motors are preferred for all purposes other than the drive motors and each motor is provided with a brake which is set to hold the motor and consequently the motor load whenever the motor is not electrically actuated and hence not in operation. Apparatus of this type is well known and therefore will not be described in detail herein. When current is supplied to the motor, the brake is magnetically released to allow normal operation of the motor. Therefore, by merely switching off the current to the various motors, other than the driving motors, the steering motors hold the wheels at any desired angle, the hoist trollies are braked at any point of travel, and the hoist motors hold the load, normally a landing craft, at any desired elevation for transit. The driving motors are preferably direct current motors because of the well known low speed-high torque characteristics attributed to such motors. Potentiometers control the magnitude of the current to these motors and hence the speed of the vehicle. Appropriate electrical brake motors are also provided. The air compressor is also driven by an electric motor.

From the nature of its intended use, it is obvious that the retriever must be massive in size. As mentioned in one embodiment, the pneumatic tires are 10 feet in diameter. The retriever rises to an overall height of 22 feet, a width of 38 feet, and a length of 75 feet. The retriever must be transported to the scene of the amphibious operation and the size of the vehicle presents a critical problem. However, the chassis of the retriever is sectionalized so that it can be substantially disassembled for transport and quickly reassembled with a relatively small crane and conventional hand tools. Each hub axle unit, together with the hub and pneumatic tire, is readily detachable at the ball and socket joints. It should be noted that each socket is made of two substantially hemispherical-dished parts bolted together. By merely connecting four bolts and the electrical and compressed air lines, an entire wheel unit can be attached to the chassis. The front horizontal axis, the front leg, and the front transverse member are all separable by removing bolts. By utilizing the strength and rigidity of tubular construction the U-frame portion of the chassis comprises three basic parts connected by simple flange couplings. Likewise, the rear legs, the rear transverse beam, and the traveling beam all are separate parts and readily assembled and disassembled. Therefore the retriever can be knocked down, transported to a desired location, and easily and quickly assembled for operation.

Once assembled, the retriever is operated by a single person from central control panels 70 with the assistance of a few helpers who perform such manual tasks as connecting the hoist hooks to the craft to be lifted and transported. Both the front and rear wheels are steerable thereby providing maximum maneuverability. The four electric hoists can be moved to accommodate almost any size load by the electrically propelled hoist trollies. The front axle system allows the vehicle to traverse uneven terrain with all four wheels remaining on the ground at all times. Each wheel is driven by a separate electric motor which eliminates the need for complex and bulky transmission which simplifies the disassembly problem. The motors are kept dry even while operating submerged in salt water by air pressure in the fluid-tight motor cases. The pneumatic tires are inflatable and deflatable as desired by the retriever operator from the central control panel to increase the retriever's ability to traverse soft and marshy beaches. Of course, the usefulness of the retriever is not limited to the specific purposes outlined above, and many additional uses will occur to those skilled in the art after a reading of the above disclosure.

We claim:

1. A chassis for a landing craft retriever comprising a front member extending in the transverse direction and a side member attached to each end thereof extending in the longitudinal direction toward the rear, said front member and said side members being of tubular construction and said side members being joined to said front member by bolted flange couplings, a vertically disposed rear leg connected adjacent the rear end of each side member by a bolted flange coupling, a rear beam extending in the transverse direction from one rear leg to the other and attached atop each rear leg by a bolted coupling, a front leg attached to said front member and pivotally connected to a transversely extending front horizontal axle to pivot about a horizontal, longitudinal axis, a wheel unit pivotally attached to each end of said front horizontal axle, and an additional wheel unit adjacent the bottom of each rear leg and attached thereto to pivot about a vertical axis, electrically actuated means for steering each wheel, each of the aforesaid wheel units including a wheel, electrical driving means for driving each wheel, and means for generating electrical current for operating said electric means.

2. A vehicle for use in retrieving landing craft, said vehicle comprising a sectionalized, tubular frame having a pair of parallel members and a first transverse member joining said parallel members at one end thereof, a leg attached at the other end of each of said parallel members and disposed normal thereto, a second transverse member interconnecting said legs adjacent the upper ends thereof, the lower ends of each of said legs including bifurcated support means carrying vertically aligned ball means for engaging a wheel assembly including a wheel and means for driving said wheel, a bifurcated support member depending from said first transverse member and including ball engaging means, axle means including oppositely disposed bifurcated support means carrying vertically aligned ball means for engaging a wheel assembly including a wheel and driving means therefor and a member disposed normal to said oppositely disposed bifurcated support means and carrying ball means at each end thereof for engagement with the ball engaging means on said depending bifurcated support means, power means carried by said vehicle, and control circuit means interconnecting said power means and said wheel assemblies.

3. A vehicle for use in retrieving landing craft, said vehicle comprising a horizontally disposed sectionalized tubular frame having a front transverse member extending in the transverse direction and a longitudinal member attached to each end of said front transverse member and extending in the longitudinal direction toward the rear of said vehicle, a vertically disposed rear leg attached adjacent the rear end of each of said longitudinal members, a rear transverse beam connecting the top ends of said vertically disposed legs, a front leg rigidly attached to and extending downward from said front transverse member, a front axle extending in a horizontal, transverse direction and pivotally coupled to said front leg in a manner to pivot about a horizontal, longitudinal axis, a front hub axle unit pivotally coupled to each end of said front axle and a rear hub axle unit pivotally coupled to the bottom end of each of said vertically disposed legs so that each of said front and said rear hub axle units pivots about a separate vertical axis, a hub carried on each hub axle unit by bearings, a pneumatic tire carried on each hub, an electric driving motor enclosed in a fluid-tight case adapted to receive and contain fluid under pressure mounted on each of said front and rear hub axle units, each of said driving motors being connected by a gear train with the respective hub in a manner to transmit torque thereto, a front steering motor housed in a fluid-tight case adapted to receive and contain a fluid under pressure mounted on said front axle and having a pinion gear meshing with a rack gear pivotally connected to a front hub axle unit, a tie bar pivotally connected to each of said front hub axle units, a rear steering motor housed in a fluid-tight case adapted to receive and contain a fluid under pressure mounted adjacent the top of each vertically disposed rear leg, each of said rear steering motors having a vertically disposed shaft with a pinion thereon meshing with a gear segment rigidly attached to the respective rear hub axle unit, internal combustion electrical generating means, electrical circuit means for controlling each electric motor individually, means for generating air under pressure, and means for delivering and maintaining air under pressure to each of said fluid-tight motor cases.

4. A vehicle for use in retrieving landing craft as set out in claim 3 wherein said front horizontal axle is pivotally connected to said front leg by a pair of ball and socket couplings arranged in horizontal, longitudinal alignment and each of said hub axle units is pivotally connected at its respective position by a pair of ball and socket couplings disposed in vertical alignment, each of said couplings having a socket comprised of a plurality of substantially hemispherically-dished parts bolted together whereby said ball is retained therein.

References Cited in the file of this patent

UNITED STATES PATENTS

| | | |
|---|---|---|
| 2,232,549 | McNamara | Feb. 8, 1941 |
| 2,360,470 | Brown | Oct. 17, 1944 |
| 2,410,965 | Dimick | Nov. 12, 1946 |
| 2,488,520 | Beck | Nov. 22, 1949 |
| 2,603,369 | Soderstrom | July 15, 1952 |
| 2,763,331 | LeTourneau | Sept. 18, 1956 |
| 2,820,557 | Emanuel | Jan. 21, 1958 |